(12) United States Patent
Horvitz

(10) Patent No.: US 8,346,587 B2
(45) Date of Patent: Jan. 1, 2013

(54) MODELS AND METHODS FOR REDUCING VISUAL COMPLEXITY AND SEARCH EFFORT VIA IDEAL INFORMATION ABSTRACTION, HIDING, AND SEQUENCING

(75) Inventor: Eric J. Horvitz, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 2103 days.

(21) Appl. No.: 10/609,819

(22) Filed: Jun. 30, 2003

(65) Prior Publication Data

US 2004/0267600 A1    Dec. 30, 2004

(51) Int. Cl.
*G06Q 10/00* (2012.01)
(52) U.S. Cl. ............................. 705/7.12; 715/744
(58) Field of Classification Search ............ 705/7, 7.12; 715/744
See application file for complete search history.

(56) References Cited

U.S. PATENT DOCUMENTS

| | | | |
|---|---|---|---|
| 5,493,692 A | 2/1996 | Theimer et al. | |
| 5,544,321 A | 8/1996 | Theimer et al. | |
| 5,555,376 A | 9/1996 | Theimer et al. | |
| 5,603,054 A | 2/1997 | Theimer et al. | |
| 5,611,050 A | 3/1997 | Theimer et al. | |
| 5,812,865 A | 9/1998 | Theimer et al. | |
| 6,353,398 B1 | 3/2002 | Amin et al. | |
| 6,466,232 B1 | 10/2002 | Newell et al. | |
| 6,513,046 B1 | 1/2003 | Abbott, III et al. | |
| 6,549,915 B2 | 4/2003 | Abbott, III et al. | |
| 6,625,577 B1 * | 9/2003 | Jameson ........................ | 705/8 |
| 6,636,242 B2 * | 10/2003 | Bowman-Amuah .......... | 715/764 |
| 6,672,506 B2 | 1/2004 | Swartz et al. | |
| 6,741,188 B1 | 5/2004 | Miller et al. | |
| 6,747,675 B1 | 6/2004 | Abbott et al. | |
| D494,584 S | 8/2004 | Schlieffers et al. | |
| 6,791,580 B1 | 9/2004 | Abbott et al. | |
| 6,796,505 B2 | 9/2004 | Pellaumail et al. | |
| 6,801,223 B1 | 10/2004 | Abbott et al. | |

(Continued)

FOREIGN PATENT DOCUMENTS

WO    9800787    1/1998

OTHER PUBLICATIONS

Development of a decision support system for Prioritization of multimedia AM Keyes, RN Palmer—Environmental Management, 1993—Springer.*

(Continued)

*Primary Examiner* — Jonathan G Sterrett

(57) ABSTRACT

The present invention relates to a system and methodology for controlling and presenting information to users in an automated manner. Sets of information items accessible by users from computer workspaces (e.g., from within and/or outside an application) are automatically hidden or reduced from view in order to facilitate user processing of a determined and/or reduced subset of information. The reduced subset is created from decision-theoretic considerations of the expected costs and benefits of hiding or mitigating information items from view or presentation while leaving more likely items or objects exposed for efficient access by users. The display of the ideal set of items takes into consideration controls that allow for the access of views that reveal sets of less likely items through one or more gestures. The control of the optimization may be facilitated by preference-assessment interfaces that allow a designer and/or a user to assess preferences about the costs of reviewing sets of items of different lengths and about the costs of gestures to reveal additional items.

19 Claims, 13 Drawing Sheets

U.S. PATENT DOCUMENTS

| | | | |
|---|---|---|---|
| 6,812,937 | B1 | 11/2004 | Abbott et al. |
| 6,837,436 | B2 | 1/2005 | Swartz et al. |
| 6,842,877 | B2 | 1/2005 | Robarts et al. |
| 7,010,501 | B1 | 3/2006 | Roslak et al. |
| 7,040,541 | B2 | 5/2006 | Swartz et al. |
| 7,063,263 | B2 | 6/2006 | Swartz et al. |
| 7,103,806 | B1 * | 9/2006 | Horvitz .......................... 714/43 |
| 7,171,378 | B2 | 1/2007 | Petrovich et al. |
| 7,195,157 | B2 | 3/2007 | Swartz et al. |
| 7,385,501 | B2 | 6/2008 | Miller et al. |
| 2001/0030664 | A1 | 10/2001 | Shulman et al. |
| 2001/0040590 | A1 | 11/2001 | Abbott et al. |
| 2001/0040591 | A1 | 11/2001 | Abbott et al. |
| 2001/0043231 | A1 | 11/2001 | Abbott et al. |
| 2001/0043232 | A1 | 11/2001 | Abbott et al. |
| 2002/0032689 | A1 | 3/2002 | Abbott, III et al. |
| 2002/0044152 | A1 | 4/2002 | Abbott, III et al. |
| 2002/0052930 | A1 | 5/2002 | Abbott et al. |
| 2002/0052963 | A1 | 5/2002 | Abbott et al. |
| 2002/0054130 | A1 | 5/2002 | Abbott, III et al. |
| 2002/0054174 | A1 | 5/2002 | Abbott et al. |
| 2002/0078204 | A1 | 6/2002 | Newell et al. |
| 2002/0080155 | A1 | 6/2002 | Abbott et al. |
| 2002/0080156 | A1 | 6/2002 | Abbott et al. |
| 2002/0083025 | A1 | 6/2002 | Robarts et al. |
| 2002/0083158 | A1 | 6/2002 | Abbott et al. |
| 2002/0087525 | A1 | 7/2002 | Abbott et al. |
| 2002/0099817 | A1 | 7/2002 | Abbott et al. |
| 2003/0046401 | A1 | 3/2003 | Abbott et al. |
| 2003/0154476 | A1 | 8/2003 | Abbott, III et al. |
| 2003/0236582 | A1 * | 12/2003 | Zamir et al. ..................... 700/94 |
| 2004/0201500 | A1 | 10/2004 | Miller et al. |
| 2005/0034078 | A1 | 2/2005 | Abbott et al. |
| 2005/0266858 | A1 | 12/2005 | Miller et al. |
| 2005/0272442 | A1 | 12/2005 | Miller et al. |
| 2005/0278323 | A1 * | 12/2005 | Horvitz et al. ..................... 707/5 |
| 2006/0019676 | A1 | 1/2006 | Miller et al. |
| 2008/0090591 | A1 | 4/2008 | Miller et al. |
| 2008/0091537 | A1 | 4/2008 | Miller et al. |
| 2008/0161018 | A1 | 7/2008 | Miller et al. |

OTHER PUBLICATIONS

A computational architecture for conversationmicrosoft.com [PDF] E Horvitz, T Paek—Courses and Lectures- . . . , 1999—research.microsoft.com.*

Principles of mixed-initiative user interfacespsu.edu [PDF] E Horvitz—Proceedings of the SIGCHI conference on Human . . . , 1999—portal.acm.org.*

Applying model-based techniques to the development of UIs for mobile computers J Eisenstein, J Vanderdonckt, A Puerta—Proceedings of the 6th . . . , 2001—portal.acm.org.*

Towards Adaptive Web Sites: Conceptual Framework and Case Study by M Perkowitz—1999.*

DAMN: A distributed architecture for mobile navigationpsu.edu [PDF] JK Rosenblatt—Journal of Experimental & Theoretical Artificial . . . , 1997—aaai.org.*

Uncertainty, Action, and Interaction: In Pursuit of Mixed-Initiative Computing E Horvitz—1999 IEEE.*

"Display of information for time-critical decision making" E Horvitz, M Barry—In Proceedings of the Eleventh . . . , 1995—eprints.kfupm.edu.sa.*

Wikipedia—"Binary Search Algorithm", pp. 1-12.*

"The Lumiere project: Bayesian user modeling for inferring the goals and needs of software users", [PDF] from psu.edu E Horvitz, J Breese, D Heckerman, D Hovel . . . —Proceedings of the . . . , 1998—Citeseer.*

Transmission and display of information for time-critical decisions [PDF] from psu.edu E Horvitz—Decision Theory Group, Microsoft Research, 1995—Citeseer.*

"Time-critical action: Representations and application" [PDF] from psu.edu E Horvitz, A Seiver—Proceedings of the 13th Conference on . . . , 1997—Citeseer.*

Andy Harter, et al., A Distributed Location System for the Active Office, IEEE Network, 1994, pp. 62-70.

Guanling Chen, et al., A Survey of Context-Aware Mobile Computing Research, Dartmouth Computer Science Technical Report, 2000, 16 pages.

William Noah Schilt, A System Architecture for Context-Aware Mobile Computing, Columbia University, 1995, 153 pages.

Mike Spreitzer, et al., Providing Location Information in a Ubiquitous Computing Environment, SIGOPS '93, 1993, pp. 270-283.

Marvin Theimer, et al., Operating System Issues for PDAs, in Fourth Workshop on Workstation Operating Systems, 1993, 7 pages.

Roy Want, Active Badges and Personal Interactive Computing Objects, IEEE Transactions on Consumer Electronics, 1992, 11 pages, vol. 38—No. 1.

Bill N. Schilit, et al., The ParcTab Mobile Computing System, IEEE WWOS-IV, 1993, 4 pages.

Bill Schilit, et al., Context-Aware Computing Applications, in Proceedings of the Workshop on Mobile Computing Systems and Applications, Dec. 1994. pp. 85-90.

Bill N. Schilit, et al., Customizing Mobile Applications, Proceedings USENIX Symposium on Mobile and Location Independent Computing, Aug. 1993, 9 pages.

Mike Spreitzer, et al., Architectural Considerations for Scalable, Secure, Mobile Computing with Location Information, in the 14th International Conference on Distributed Computing Systems, Jun. 1994, pp. 29-38.

Mike Spreitzer et al., Scalable, Secure, Mobile Computing with Location Information, Communications of the ACM, Jul. 1993, 1 page, vol. 36—No. 7.

Roy Want, et al., The Active Badge Location System, ACM Transactions on Information Systems, Jan. 1992, pp. 91-102, vol. 10—No. 1.

Mark Weiser, Some Computer Science Issues in Ubiquitous Computing, Communications of the ACM, Jul. 1993, pp. 75-84, vol. 36—No. 7.

M. Billinghurst, et al., An Evaluation of Wearable Information Spaces, Proceedings of the Virtual Reality Annual International Symposium, 1998, 8 pages.

Bradley J. Rhodes, Remembrance Agent: A continuously running automated information retrieval system, The Proceedings of the First International Conference on the Practical Application of Intelligent Agents and Multi Agent Technology, 1996, pp. 487-495.

Eric Horvitz, et al., In Pursuit of Effective Handsfree Decision Support: Coupling Bayesian Inference, Speech Understanding, and User Models, 1995, 8 pages.

Bradley J. Rhodes, The Wearable Remembrance Agent: A System for Augmented Theory, The Proceedings of the First International Symposium on Wearable Computers, Oct. 1997, pp. 123-128.

Eric Horvitz, et al., Attention-Sensitive Alerting in Computing Systems, Microsoft Research, Aug. 1999.

Bill N. Schilit, et al., Disseminationg Active Map Information to Mobile Hosts, IEEE Network, 1994, pp. 22-32, vol. 8—No. 5.

Mark Billinghurst, et al., Wearable Devices: New Ways to Manage Information, IEEE Computer Society, Jan. 1999, pp. 57-64.

Thad Eugene Starner, Wearable Computing and Contextual Awareness, Massachusetts Institute of Technology, Jun. 1999, 248 pages.

Bradley J. Rhodes, The Wearable Remembrance Agent: A System for Augmented Memory, Personal Technologies Journal Special Issue on Wearable Computing, 1997, 12 pages.

Workshop on Wearable Computing Systems, Aug. 19-21, 1996.

Mark Billinghurst, Research Directions in Wearable Computing, University of Washington, May 1998, 48 pages.

Mark Weiser, The Computer for the 21st Century, Scientific American, Sep. 1991, 8 pages.

T. Joachims, Text categorization with support vector machines: learning with many relevant features, Machine Learning, European Conference on Machine Learning, Apr. 21, 1998, pp. 137-142.

International Search Report dated Sep. 29, 2003 for PCT Application Serial No. 00/20685, 3 Pages.

Robert M. Losee, Jr., Minimizing information overload: the ranking of electronic messages, Journal of Information Science 15, Elsevier Science Publishers B.V., 1989, pp. 179-189.

* cited by examiner

MODELS AND METHODS FOR REDUCING VISUAL COMPLEXITY AND SEARCH EFFORT VIA IDEAL INFORMATION ABSTRACTION, HIDING, AND SEQUENCING

TECHNICAL FIELD

The present invention relates generally to computer systems and more particularly, relates to systems and methods for automatically reducing the amount of information to be processed or presented to users by performing a decision-theoretic cost benefit analysis associated with the cost of navigating to an information item from a subset of items versus the benefit of hiding the item in order to facilitate user processing of information.

BACKGROUND OF THE INVENTION

Computer systems have greatly facilitated productivity and efficiency in the modern work environment. Tools such as application windows, browsers, search engines, menus, icons, folders, configuration settings, help files, and other items are routinely dispersed on a user's desktop or laptop computer and associated display. Many users have dozens of such items from which to select (e.g., application icons, folder directories, images) in order to perform common computer tasks such as running an application or searching for information. Searching often involves "drilling down" from one level via a "mouse click" to a desired sub-level to find desired information. When attempting to locate information however, computer users often have to peruse or look at a plurality of disassociated display objects in order to select the object of interest which then often involves further drilldown operations into another sublevel after selecting a desired object. When navigating to a different sublevel (e.g., subdirectory), respective sublevels are also often populated with a plurality of other information items to be scanned and further selected by the user.

As a consequence of the power of computers and the relatively low cost of memory, computer workspaces and/or applications themselves are offering ever-increasing options for users to select from. In a workspace example, a common desktop may provide application icons for running an application, folder icons for saving information, and other objects such as various menus from which to operate the computer in addition to various files created by the users themselves. In an application setting, various menus, toolbars, selection inputs, menu selections, and file management tools are provided to facilitate operations with the selected application. When using search engines or search utilities for example, often times hundreds of disparate items are returned and presented to users as a result of a search for desired information. The returned results typically must then be gleaned over to find the one or two items of interest. Clearly, having to process more information items causes users to lose valuable time and reduce overall efficiency. In some cases, having more tools or item selection capabilities at one's disposal causes some users to decrease their productivity even though their computers have increased capabilities.

As a consequence of so many options for creating and manipulating information or data, desktop and/or application workspaces have become increasingly cluttered. Thus, when a user attempts to find a piece of information or go to a directory to run an application, the user may have to inspect or view dozens of display items to find the particular item of interest. As can be appreciated, the more features that are added to computer systems—including items created by the user such as files, the more tedious it becomes to manage and efficiently process such items. Consequently, there is a need to more efficiently manage computer data presentations to users in an automated manner.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates to a system and methodology for controlling and presenting information to users in an automated manner. To date, methods for making decisions about the decomposition of items into viewed immediately and those viewed with additional gestures, such as invoking a "More" button or hovering to wait for an expansion have largely relied on heuristic designs or policies. Such systems do not encode a formal cost-benefit analysis that considers a user's preferences about complexity of an initial view versus the cost or frustration of seeking more options or items via explicit operations to access additional detail.

According to the present invention, sets of information items accessible by users from computer workspaces is automatically hidden or reduced from view in order to facilitate user processing of a determined and/or reduced subset of information. The reduced subset is created from decision-theoretic considerations of the benefit of hiding or mitigating superfluous information items from view or presentation while leaving more relevant items exposed for efficient access by users. Efficiency is increased since users are given a reduced amount of highly useful items (e.g., tokens, clusters, files, folders, icons, menus, tools, text, data) to select while not having to sift through large amounts of extraneous material such as rarely used selections.

The benefit of hiding is analyzed and weighed against associated navigation costs that may accrue as a result of removing or relocating respective items from the user's current workspace (e.g., selection menu containing search results). Thus, a cost-benefit analysis is performed wherein a subset of information items are displayed to users if the cost of navigating to the displayed item (if the item were clustered, tokenized, relocated or removed) is outweighed by the benefits of hiding the respective item—the benefits being less items on the user's workspace to search through and therefore increasing the ability of the user to cognitively process the determined subset of items.

The present invention provides various components and processes to reduce or minimize the size of a collection of items that are to be processed by users. In one aspect, a proper subset d of a larger set a containing n items under consideration is displayed explicitly to a user. The user reviews a visualization with cardinality of |d| items. The complementary elements of the collection, subset h, of |h| items are typically hidden or abstracted into a single identifier (e.g., an identifier that states, "Click to display more items . . . ") that can be accessed to view |h| elements of subset h.

The subset of |d| items displayed can be selected from set a in different ways, including by an estimate of the top |d| elements by the likelihood that each element is the target element, by alphabetical order, or by a random sub-selection of |d| elements from elements in n, among other numerous approaches to sub-selection. Rather than selecting a top m values of n total items, the sub-sample m can be made a function of properties of the items. For example, one situation considers a computer user that seeks a single target item from a set of n candidate items.

A subset d of displayed items of cardinality |d| can be determined by adding items to the subset d for display in order of the estimated likelihood that each displayed item in d will be the target item. Elements are not added to d after the likelihood that the item is in d grows to be equal or greater than a desired probability that one of the items i contained in the subset is actually the target item t and expressed as, $$p(t \in d|E,|d|) \geq \sum_{i \in d} p(i \text{ is } t | E)$$

The present invention addresses the optimization of the size of collections hidden (e.g. lists of items, and other configurations of items) and the nature and number of objects hidden or abstracted into high-level tokens, by considering several key properties and tradeoffs with completeness versus ease of identification. The larger a collection (e.g., a list) of items, the more comprehensive it is, and the more likely it is to contain one or more items of interest, or target items. However, the more elements contained in a collection, the more search effort is required to find one or more items of interest. By abstracting one or more subsets of the total items into tokens or other formats, the present invention mitigates the effort required to identify whether an item is in a displayed subset of items, and to facilitate selection of the item itself.

If the item is not contained in the displayed subset, a gesture may be provided, such as clicking on a high-level token to, for example, reveal some or all of the hidden items. Such a gesture requires user effort and introduces a cost that trades off with the expected value of reducing the complexity of the displayed items. The present invention processes this tradeoff in terms of an analysis of the display of a subset list of items and the hiding of the other elements of a set of potentially useful items, with a cost associated with the revelation of the hidden list. It is noted that the above automated analysis can be generalized to other formulations, involving multi-step revelations of hidden items, hierarchical nestings of hidden files, and/or for visualizations of subsets of items beyond lists and tokens that hide items, such as clusters of items arranged for display and hiding in other configurations.

To the accomplishment of the foregoing and related ends, certain illustrative aspects of the invention are described herein in connection with the following description and the annexed drawings. These aspects are indicative of various ways in which the invention may be practiced, all of which are intended to be covered by the present invention. Other advantages and novel features of the invention may become apparent from the following detailed description of the invention when considered in conjunction with the drawings.

DETAILED DESCRIPTION OF THE INVENTION

The present invention relates to a decision-theoretic approach to presentation and navigation of objects such as object granularity and the amount of objects to display—it applies to almost any situation dealing with a set of items such as display objects, icons, information chunks, selection options, files, folders, and/or other information that may appear on or within a user's workspace such as an application. Many systems provide sets of items or objects as results, but without much thought given to how to display the sets and how much of the set to display. The present invention takes into consideration the cost associated with adding an item (or leaving an item) to a current or displayed set of items (e.g., as a function of screen real-estate, view-ability, user consumption/comprehension . . . ) and balances the benefits of finding a desired item in a reduced subset with the cost associated with drilling down in the currently displayed set. Thus, the invention provides for a system that automatically controls the amount of results to be displayed via employment of formal decision theory metrics in order to optimize display of the items/objects and facilitate user processing of information.

As used in this application, the terms "component," "analyzer," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 1:
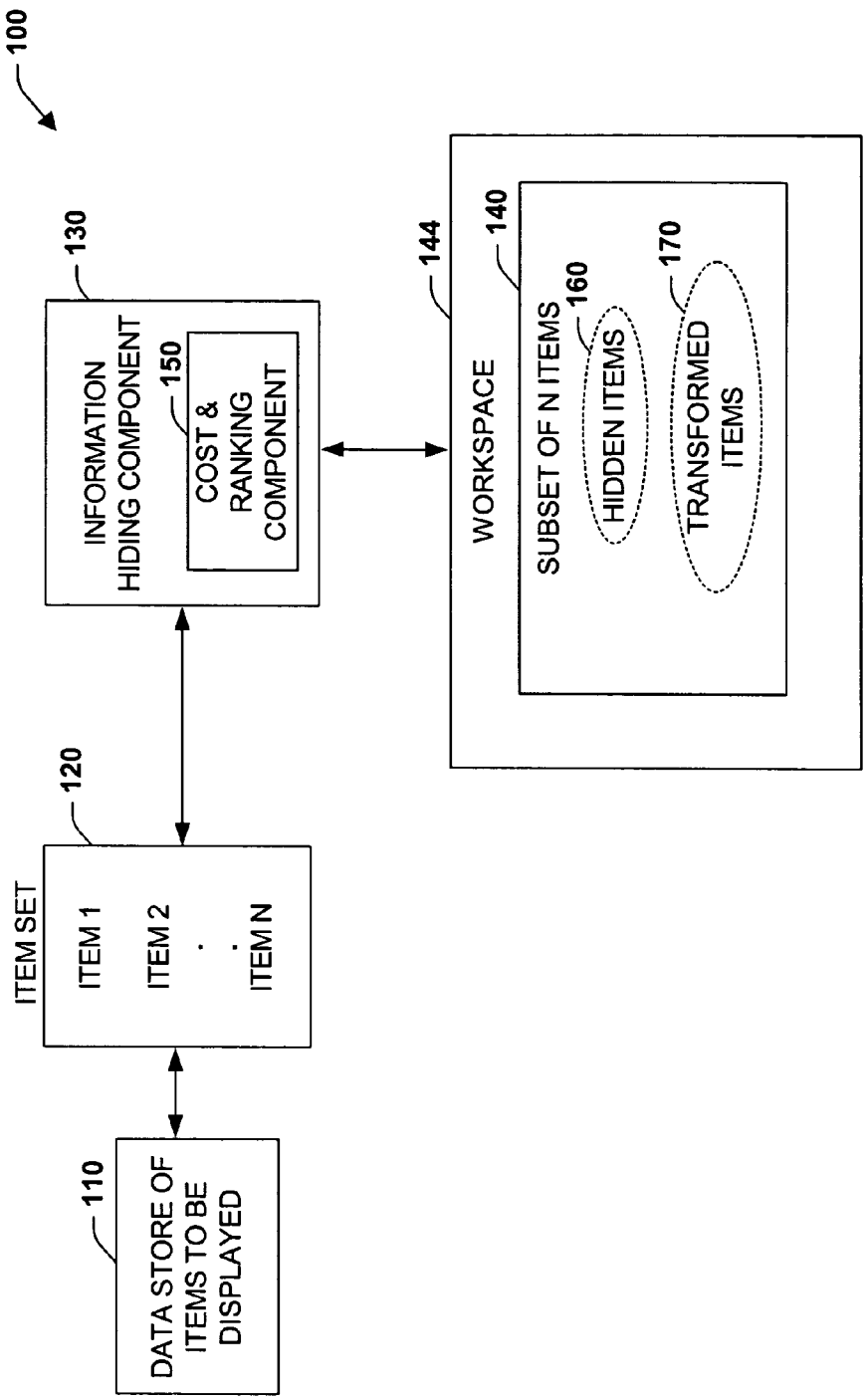
FIG. 1 is a schematic block diagram illustrating information hiding in accordance with an aspect of the present invention.

Referring initially to FIG. 1, a system 100 illustrates information hiding in accordance with an aspect of the present invention. In this aspect, a data store 110 having one or more item sets 120 is analyzed by an information hiding component 130 that determines a subset of items 140 to present or display to a user's workspace 144 (e.g., workspace including inside an application boundary and/or outside the application such as on a user's desktop background). The item set 120 can include substantially any type of information to be presented or processed by a user such as icons, folders, directories, lists, menus, graphics, applications, text, data, and so forth.

The information hiding component 130 analyzes the item set 120 to determine if a respective item or items within the set can be reduced or removed from the user's workspace 144 in order to facilitate user processing of information by generating the subset of items 140 which in most cases is reduced in form from the item set 120. For example, if the item set 120 were a grouping of N display folders, the item subset 140 may include N-1 folders or items (or other reduction, e.g., N-2, 3, and so forth). It is to be appreciated that not in all cases, that the subset of items 140 is changed or lowered in value from the item set 120. For example, the information hiding component 130 may determine that none of the items in the item set 120 should be changed (e.g., relocated to another memory portion) since the cost of navigating to the relocated item is outweighed by the benefit of hiding the information.

The information hiding component 130 employs a cost and ranking component 150 to determine whether or not items in the item set 120 should be altered or hidden from the user's view at 140. In one example, this may include hiding, relocating, or removing items from view at 160, whereby if a respective item is hidden, an alternative navigation path such as a token or icon may be provided for the hidden item as is described in more detail below. In another example, item transforms may occur, at 170 wherein the respective item is changed in appearance from previous presentations (e.g., clustering several items under a subsequent item, sizing an icon or other structure associated with an application or data).

The cost and ranking component 150 which is described in more detail below with respect to FIG. 2, generally assigns a likelihood or relevance factor to respective items appearing in the item set 120. Such a factor can be stated in terms of an item's relevance to a user in context including evidence relating to the item such as information about usage, usage patterns of items or related items, content associated with items, time of day, content topic, recently accessed content or recently accessed topic content and so forth.

A measure of relevance can be an estimate of the probability that an item is desired for view or access by a user. A probability estimate can be computed for example by taking the frequency of times that an item is accessed in similar situations for within some number of times of usage, some real-time horizon (e.g., last week, last month, history of usage of a computer, etc.). After the likelihood that items are the intended target or goal of a user have been determined, a plurality of cost considerations are provided to determine whether to display an item versus the benefit of hiding the item from the user's view via the subset of items 140 (or changing the item's appearance). Thus, if the cost of displaying the item is very high in terms of the benefit received from having fewer items to process, then the respective item can be removed, changed, and/or relocated in order to reduce the amount of information to be processed by the user at the workspace 144.

Other considerations in computing a likelihood include analyzing such aspects as a user's state such as the user's level of attention, focus, goals, and/or busyness which can be inferred or determined by monitoring a user's current activities (e.g., typing, talking, head gaze and so forth). The user state may also include determining the user's context such as meeting, talking on phone, conversing in office, and so forth that can be detected from various sources such as electronic calendars, microphones and cameras, for example. Thus, if it is determined that the user is currently in a relaxed state, then the information hiding component 130 may display more respective items to the user since the user may be in a better position to analyze more rather than less information due to the relaxed state of attention.

The likelihood factor can also be assigned based upon the properties of the structure and content. For example the a classifier can be used to assign a maximum likelihood topic label for a document and probabilities that a document is a user's target can be conditioned on the inferred topic, or the dominant topic associated with documents being recently interacted with.

It is noted that the cost of reviewing items can change with changes in several factors, including details of the configuration of the display of the items, and details about the gestures required to assess additional items. Such costs can be based in design considerations, or also be dynamically accessed, (e.g., there may be additional costs that are folded into the display of a list as a function of the list's temporary visual obfuscation of content that is being monitored beneath the list).

Figure 2:
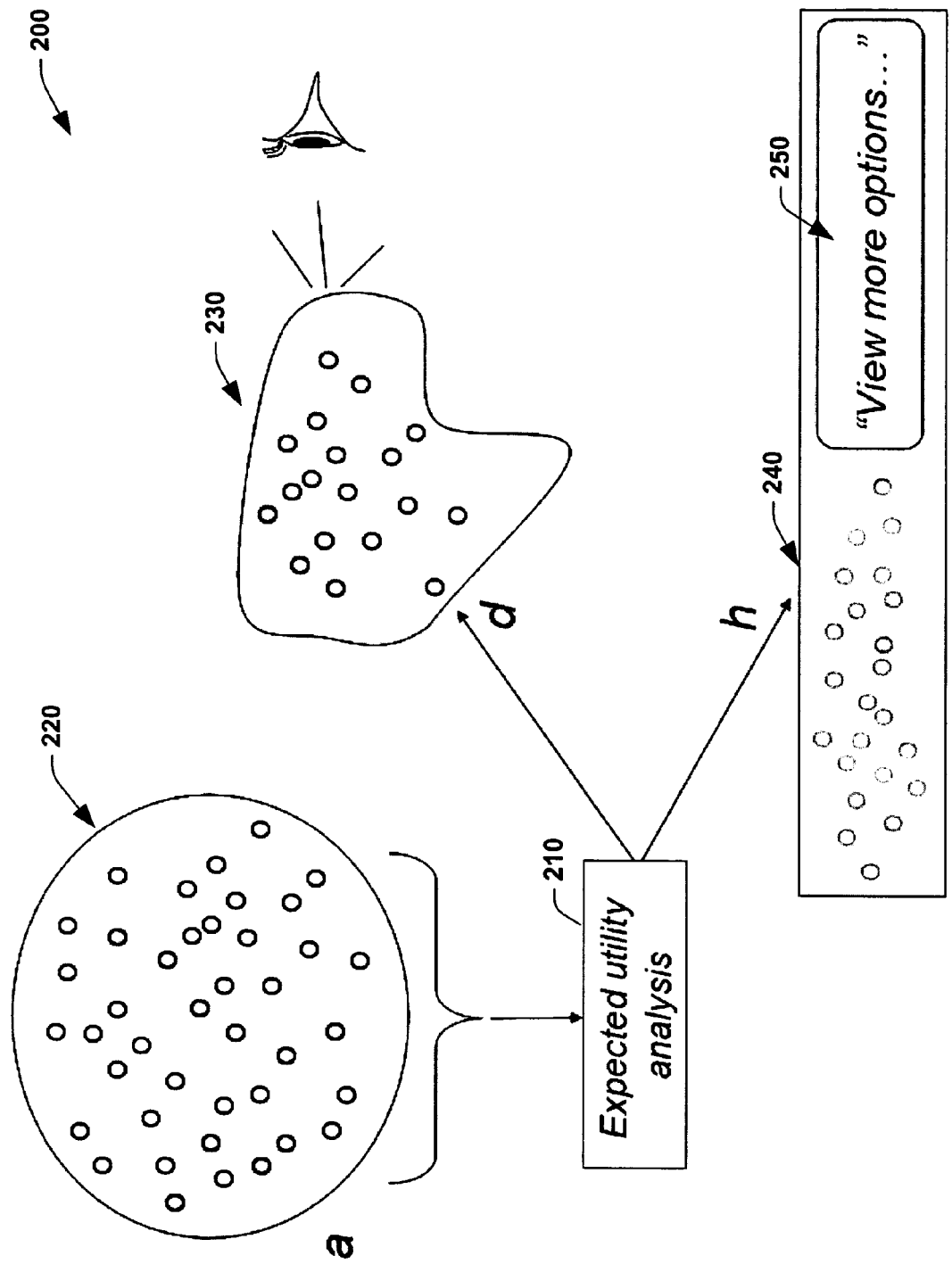
FIG. 2 is a diagram illustrating an expected utility analysis system in accordance with an aspect of the present invention.

Referring now to FIG. 2, a system 200 illustrates expected utility analysis in accordance with an aspect of the present invention. The system 200 includes an expected utility analysis component 210 to segment a set of candidate items or options 220 (also referred to as a) into a subset of displayed items 230 (also referred to as d) and one or more subsets of items 240 (also referred to as h) that are hidden but accessible via action or gesture illustrated at 250 (e.g., mouse click to navigate for hidden information).

The system 200 processes the set a that contains a number of elements |a|=n total candidate items that may be of interest or value to a user (e.g., search results, menu items, etc.) and typically, a single target item. The n items are then automatically separated into two proper subsets of a, including a displayed subset d of |d| items and a hidden subset h of |h| items, where |d|+|h|=n. As noted above, a function can be provided that applies an ordering to the goodness or relevance of items to a user in a context, defined by observed evidence, E. E can include one or more of background information about usage, usage patterns of items or related items, content associated with items, time of day, content topic, recently accessed content or recently accessed topic content, and so forth. One ranking function is a coarse or accurate estimate of the likelihood that each item i in the set a is the target item at the time of display and/or access, p(i is target|E). If a formal probabilistic methodology is unavailable, a probability function can be mapped to other ranking functions. Such a mapping can be learned or can be applied as a heuristic function.

As an example, a probability function can be composed that gives a likelihood, p(i is target|E), the function is normalized to 1.0 for all of the items, such that $$\sum_{i \in a} p(i \text{ is } t \mid E) = 1.0$$

If this is the case, then, for any set of items selected to be moved to the set of displayed items, d, the likelihood that the item will be in the set is, $$p(t \in d \mid E) = \sum_{i \in d} p(i \text{ is } t \mid E)$$

The probability that the item is not in d is the complement, $$p(t \neg \in d \mid E) = 1 - \sum_{i \in d} p(i \text{ is } t \mid E)$$

Next an expected value can be processed (including expected costs and benefits) of moving the top items of d, leading to a cardinality of |d|, and the rest |h| into the set of hidden items, h, where, again, the total items in the original set a, |a|=|d|+|h|.

A set of costs can then be processed, as follows:

Costs:

$C_{s,d}$: Cost of a user scanning through d given target is in d.

$C_{s,h}$: Cost of a user scanning through h (when set of items h is accessed).

$C_h$: Cost of a user accessing h.

$C_{s,d'}$: Cost of a user scanning through d given that d does not contain the target.

$C_0$: Cost of obfuscation as a function of list size.

The costs can be summarized by processing functions that yield estimates of the costs for different situations based on such details as specifics of a configuration. For example, functions can be developed through observation and fitting of the time and/or frustration of users as gleaned from user studies, or via heuristic estimates of the time, providing a set of functions that assign cost.

The cost, $C_{s,d}$ is first described. The cost, $C_{s,d}$, is associated with scanning the items in d, which is some function of the configuration (e.g., a list) and g(|d|). As an example, for a list configuration, the expected cost (on average) of finding a target item on a list, when the target is present, where cost is measured in terms of the number of items that are scanned before finding the target, is |d|/2 if the list is random, and preferable if the list is sorted by likelihood (versus randomly), thus, employ |d|/2 as a worse-case expectation. The average cost of scanning down the list to find a target item, given a list sorted from the highest to lowest probability that each item is the target is described by the following equation:

Take $p(x_i|E)$ as representing the likelihood p(item $x_i$ is the target t|E). The expected number of items <n> to scan before finding target, $$\langle n \rangle = p(x_1 \mid E) * 1 + \qquad (1)$$
$$(1 - p(x_1 \mid E)) \, p(x_2 \mid E) * 2 +$$
$$(1 - p(x_1 \mid E)) * (1 - p(x_2 \mid E)) * p(x_3 \mid E) \, 3 +$$
$$(1 - p(x_1 \mid E)) * (1 - p(x_2 \mid E))(1 - p(x_3 \mid E)) * p(x_4 \mid E) * 4 + \ldots$$
$$(1 - p(x_1 \mid E)) * (1 - p(x_2 \mid E))(1 - p(x_3 \mid E)) \ldots (1 - p(x_n \mid E)) *$$
$$p(x_n \mid E) * n$$

This can be written more compactly as, $$p(x_1 \mid E) + \sum_{i=1}^{n-1} \left( \prod_{1}^{i} (1 - p(x_i \mid E)) * p(x_{i+1} \mid E) i + 1 \right) \qquad (2)$$

Instead of considering the number of items, the equation can be weighted by considering the time associated with scanning the items. Substituting t(n), in for the cost of scanning n items as follows, $$C_{s,d} = p(x_1 \mid E) t(1) + \sum_{i=1}^{n-1} \left( \prod_{1}^{i} (1 - p(x_i \mid E)) * p(x_{i+1} \mid E) t(i+1) \right) \qquad (3)$$

In the more general case, a function capturing the cost of scanning increasingly longer lists, C(n), can be provided and this can be a nonlinear function, such as one that grows exponentially with the length, $$C_{s,d} = p(x_1 \mid E) C(1) + \sum_{i=1}^{n-1} \left( \prod_{1}^{i} (1 - p(x_i \mid E)) * p(x_{i+1} \mid E) C(i+1) \right) \qquad (4)$$

The cost, $C_{s,d'}$, of scanning the list when the item is not present in d is the cost of scanning the full list. This is also a function of the configuration and cardinality, |d|, $C_{s,d'}=C(|d|)$.

If a target is not found on the list d, it can be assumed that a user will attempt to access items from the previously hidden items in the hidden set of items, h. The cost includes the cost of performing a gesture to make access to hidden items occur, $C_h$, which is a function of user interface design. For a design where h is revealed after a pre-set threshold of dwell time on d, this cost is the time associated with a dwell for a threshold time greater than the pre-set threshold. In other cases, this cost is the time and/or frustration with performing an explicit gesture (e.g., opening a folder or selecting a button labeled "More items"). This cost can be placed in the same units as the cost of scanning objects so as to develop an optimization. For example, for a model of cost to the user where the cost of scanning items grows linearly with the number of items, a user or user-interface designer can make the cost of access equivalent to scanning some number of items.

Given an access of h, the cost, $C_{s,h}$, of scanning through h is computed in a similar manner as the cost for the scanning through the displayed list d, per Equations 1 through 4, but substituting the likelihoods for items in h. Given cost measures, a decision-analytic component can be provided that takes as inputs, or that assigns, probabilities that each item is the target item, and that segments the complete set of candidate items, a, into d and one or more sets $h_i \ldots h_n$.

In another aspect, a case can be considered where a is segmented into a single d and h. The analysis for multiple sets $h_i \ldots h_n$ follows from the analysis for the case with a single hidden set h. If the list of items is sorted by probability, the overall cost associated with a specific segmentation is as follows:

$$\text{Cost}(|a|, |d|) = C_{s,d} \sum_{i \in d} p(x_i | E) + \left(1 - \sum_{i \in d} p(x_i | E)\right)(C_h + C(|d| + C_{s,h})) \quad (5)$$

where $|h| = |a| - |d|$.

Ideal segmentation can be determined by identifying an ideal d, d*, of size |d|*, the segmentation of all items a into the displayed items d (and h via complementarity) that minimizes this cost to the user as follows, $$|d|^* = \arg\min_d \text{Cost}(|a|, |d|) \quad (6)$$

$$= C_{s,d} \sum_{i \in d} p(x_i | E) + \left(1 - \sum_{i \in d} p(x_i | E)\right)(C_h + C(|d| + C_{s,h}))$$

Selecting the ideal number of items from the items, sorted by their likelihood estimations of being the target item, provide the ideal set of displayed and hidden items. As noted above, the cost of reviewing items can change with changes in several factors, including, details of the configuration of the display of items, and details about the gestures required to assess additional items. Such costs may typically arise in design considerations, or also be dynamically determined, (e.g., there may be additional costs that are folded into the display of a longer list as a function of the list's temporary visual obfuscation of content that is being monitored beneath the list). This factor can be analyzed as a "cost of obfuscation" in the equations above wherein the cost of obfuscation is a function of the list size. Such additional cost factors may be non-linear with the increases in the size of lists or other display configuration as the display size required may not hide an important item on the screen until it reaches some threshold value, where it starts to obfuscate display screen real estate currently being used to display the important previously displayed content.

Figure 3:
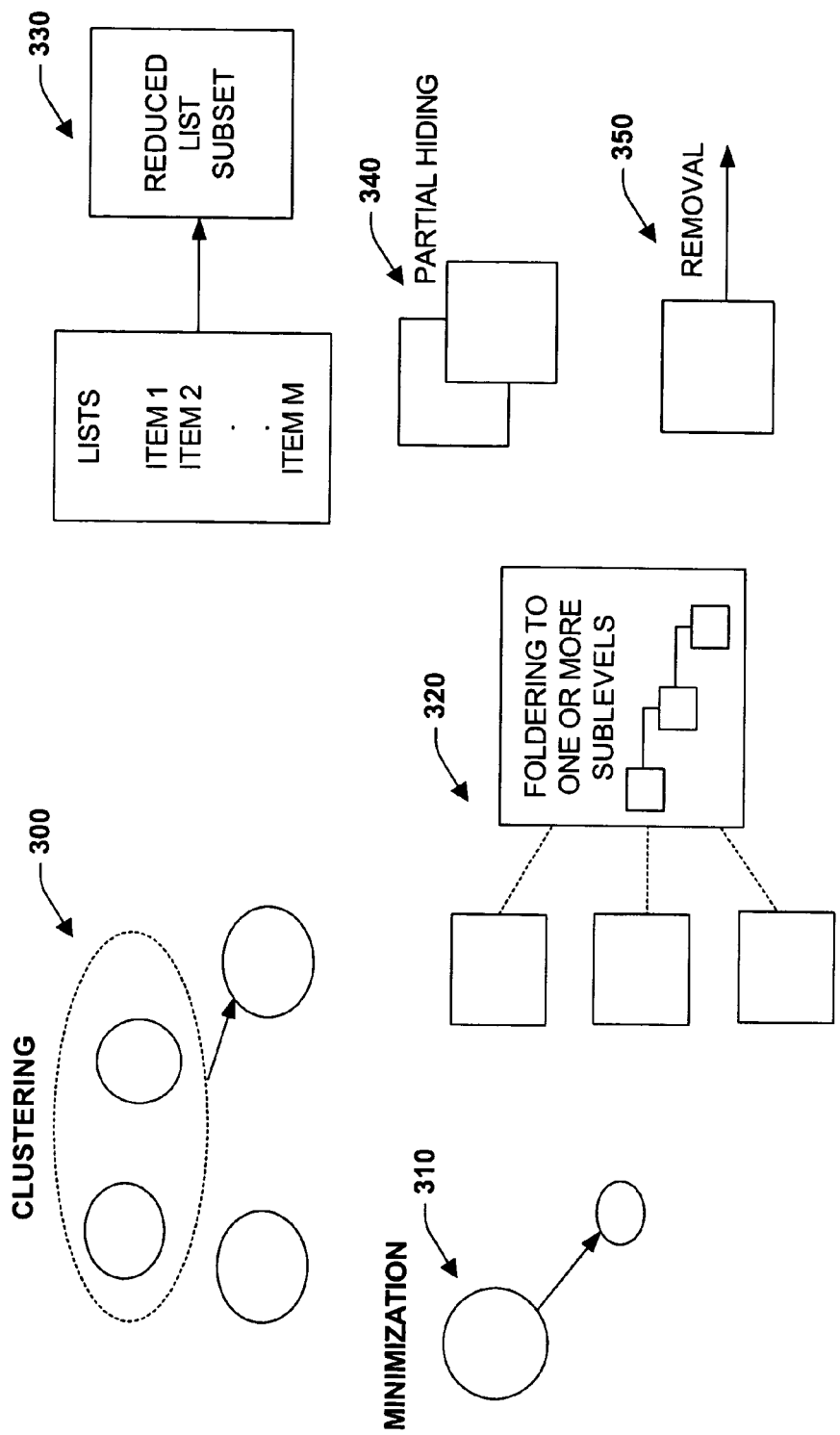
FIG. 3 is a diagram illustrating various information hiding concepts in accordance with an aspect of the present invention.

Turning to FIG. 3, various information hiding concepts are illustrated in accordance with an aspect of the present invention. Before proceeding with a discussion of FIG. 3, it is noted that the hiding concepts described therein can be applied within an application boundary and/or external to the application. For example, a user's desktop may have several items that are hidden and removed to other locations based upon an operating system task, whereas an application may hide items within the application based upon internal tasks or calls to operating system tasks that invoke hiding operations.

At reference numeral 300, two items of a three-item set are clustered into a single item thus leaving a two-item subset from the original set. This can include creating icons or folders for example that supply a navigation path to the clustered items contained therein. At 310, item minimization occurs. This may include merely reducing the size or area an information item occupies within a user's respective workspace. At 320, one or more folders/files can be relocated or moved to one or more sublevels (e.g., hierarchical directory locations). At 330, lists or items descriptions/data can be reduced in size to a reduced list or subset of information. At 340, partial hiding of items is illustrated. Thus, instead of completely removing or relocating a respective item, the item may be placed or moved to a presentation area that partially blocks a user's view of the entire item. If the user were to mouse or select the partially hidden item, then a full representation of the item can be provided. At 350, an item can be removed such as automatically dumping an item to a trash folder that may be periodically emptied, for example. Removal may be useful for such items as temporary Internet files, for example, that may not likely be accessed again after the first encounter with the file. As will be described in more detail below with respect to FIGS. 8 and 9, selection options such as arrows indicating hidden content for further drill-down of information can be provided.

Figure 4:
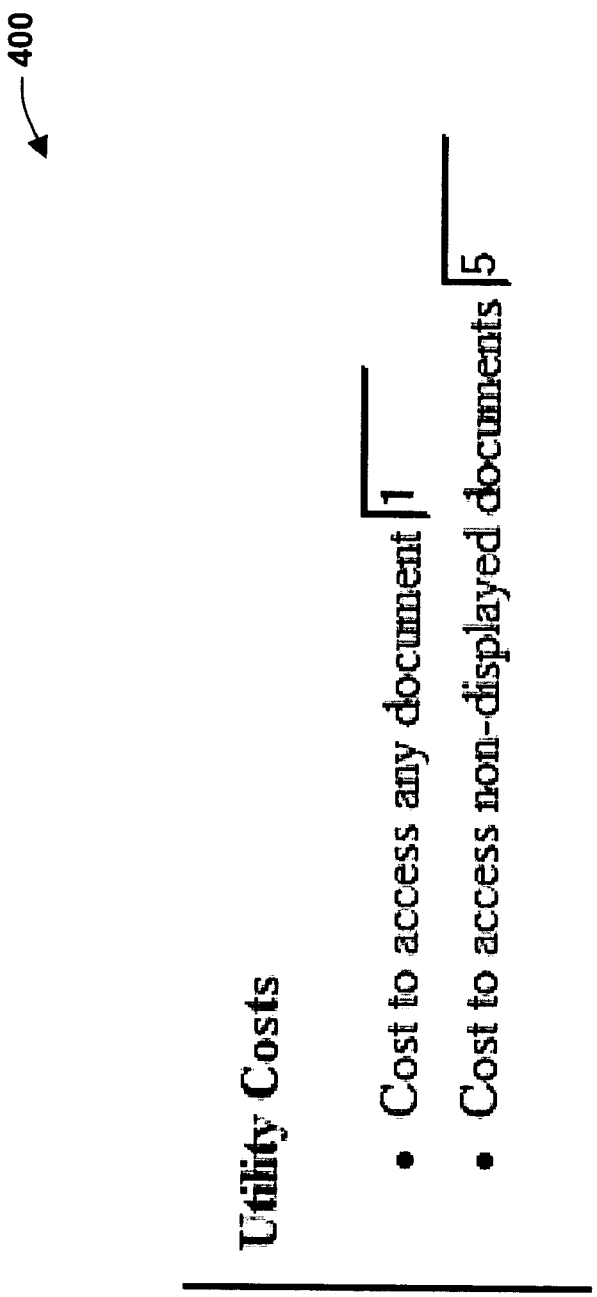
FIG. 4 is a flow diagram illustrating an automated information hiding process in accordance with an aspect of the present invention.
Figure 5:
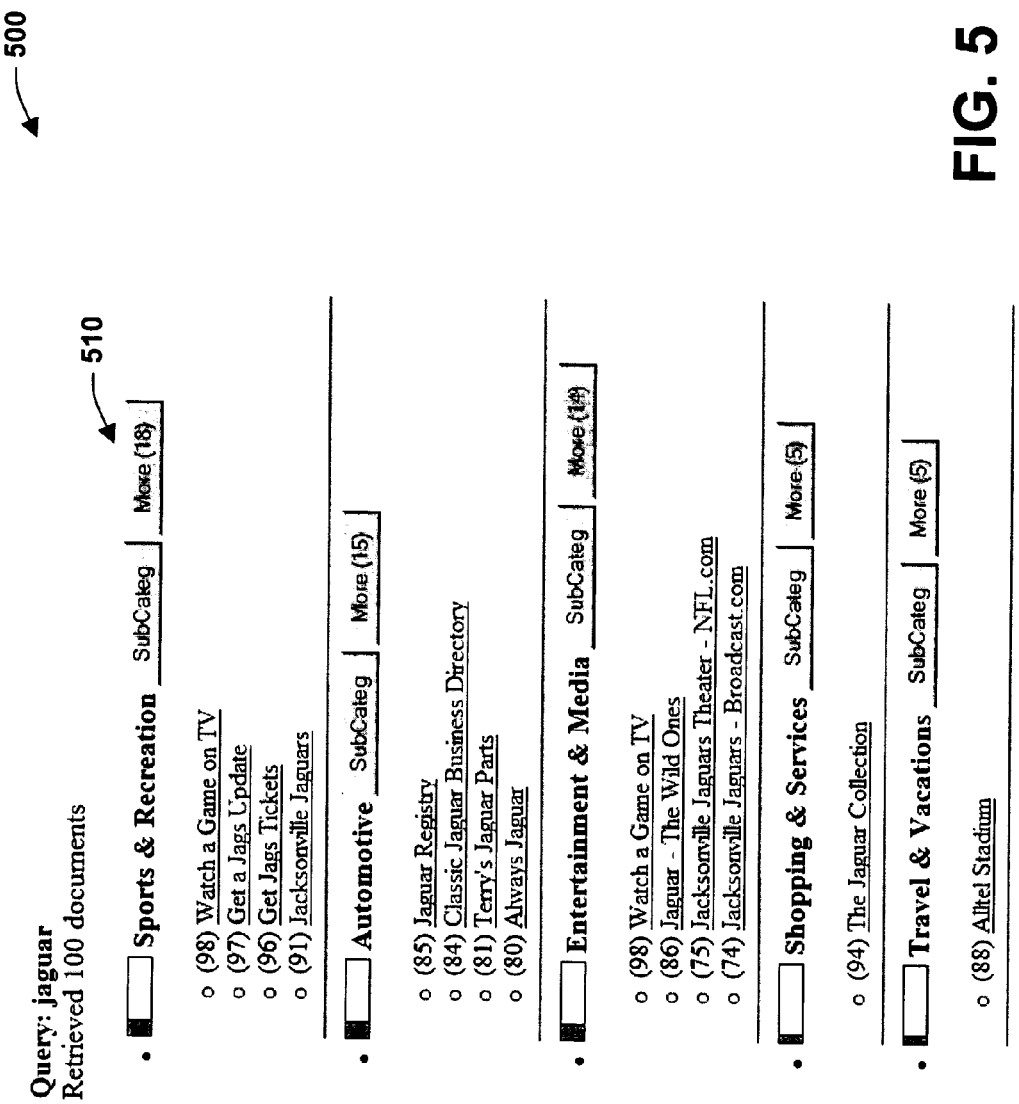
FIGS. 5-7 illustrate an example application of automated information hiding in accordance with an aspect of the present invention.
Figure 6:
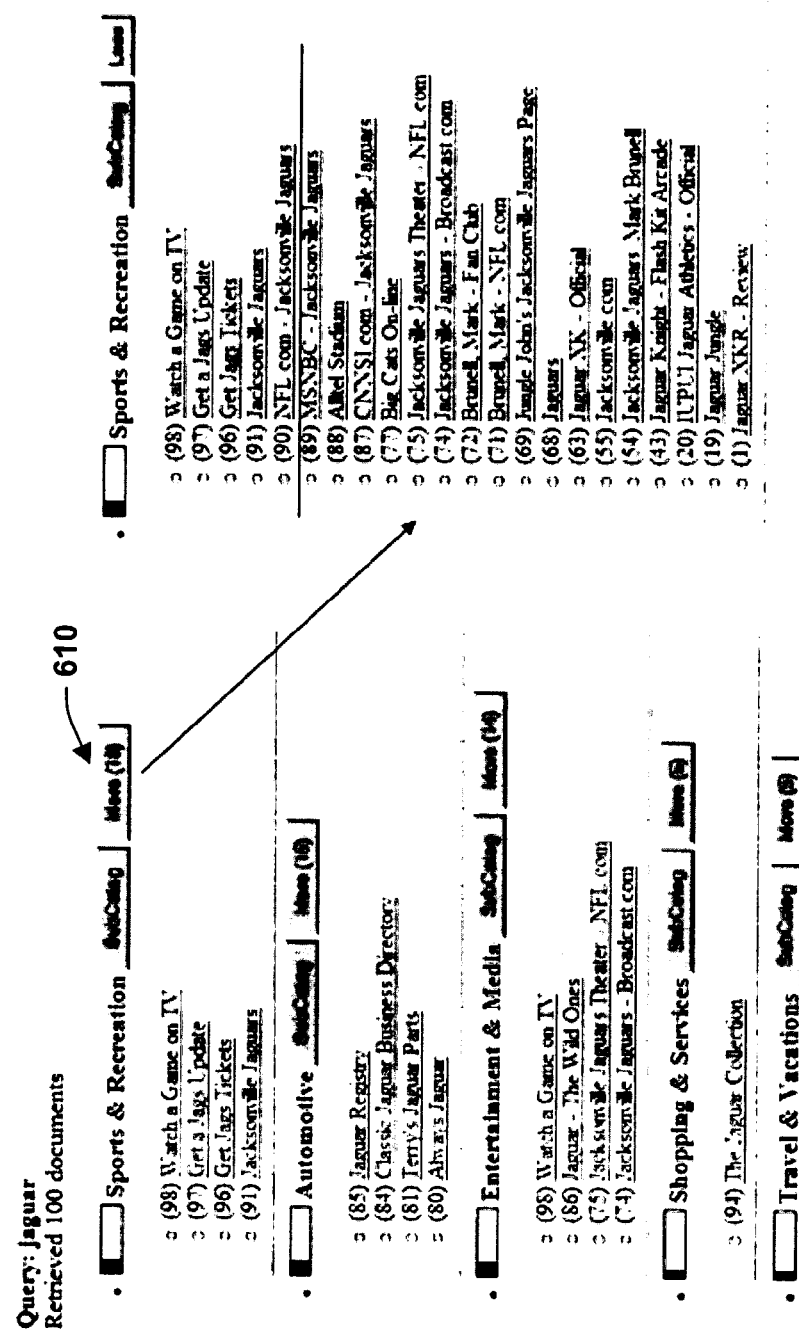

FIGS. 4-6 illustrate an example application of automated information hiding in accordance with an aspect of the present invention. As noted above, the systems and methods of the present invention can be applied in such applications as displays of menus for actions and for displays of results provided to queries in search applications. FIG. 4 illustrates a user preference tool 400 for a search engine that categories query results into topic categories via a topic classifier. For each category, a hiding optimization is applied based on preferences indicated by a user. FIG. 4 shows an assessment of example user preferences. In this case, a user states that each item viewed has a cost of 1 and that accessing a "More" results button is equivalent to viewing 5 additional items. As can be appreciated, other selection values are possible.

FIG. 5 displays the results of a search with the term "Jaguar." An initial display 500 shows a list of displayed items, d, and provides a "More" button 510 showing how many results are currently hidden in h. FIG. 6 shows an expansion 600 of the hidden set h for a category of interest, accessed by the user clicking on a "More" button at 610. It is noted that decomposition of a into d and h can be applied recursively to enable multiple level hiding for a nesting of analyses as described above. That is, a top-level a, $a_1$, is decomposed into $d_{a1}$ and $h_{a1}$ and $h_{a1}$ can then be viewed as a new a, a', for which a new decomposition, d' and h' are considered and so on.

Figure 7:
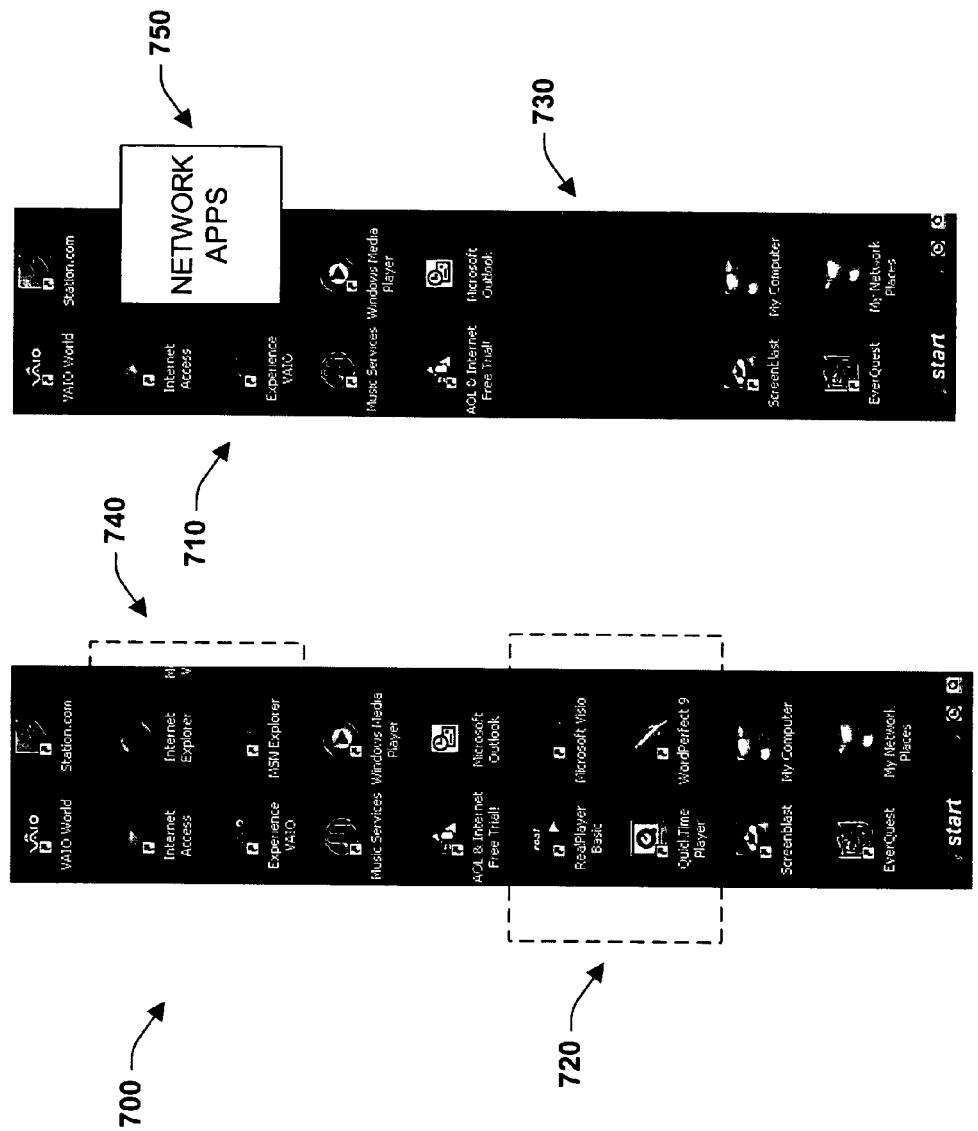

FIG. 7 illustrates information hiding and clustering in a desktop environment in accordance with an aspect of the present invention. In this aspect, a sample desktop is illustrated at 700 before information hiding is applied thereto. At 710, the same desktop is illustrated, wherein hiding and clustering is applied. For example, four application icons at 720 have been hidden, removed, or relocated as illustrated at 730. As noted above, such hiding can include moving the respective applications to another folder/directory or moving the applications to a trash bin for removal, if desired. Controls can be given to the user to enable automatic relocation of files or items or to answer a question such as "Do you want to remove these files now from your desktop?" At 740, two network applications are clustered into an icon or display item entitled network apps at 750.

Figure 8:
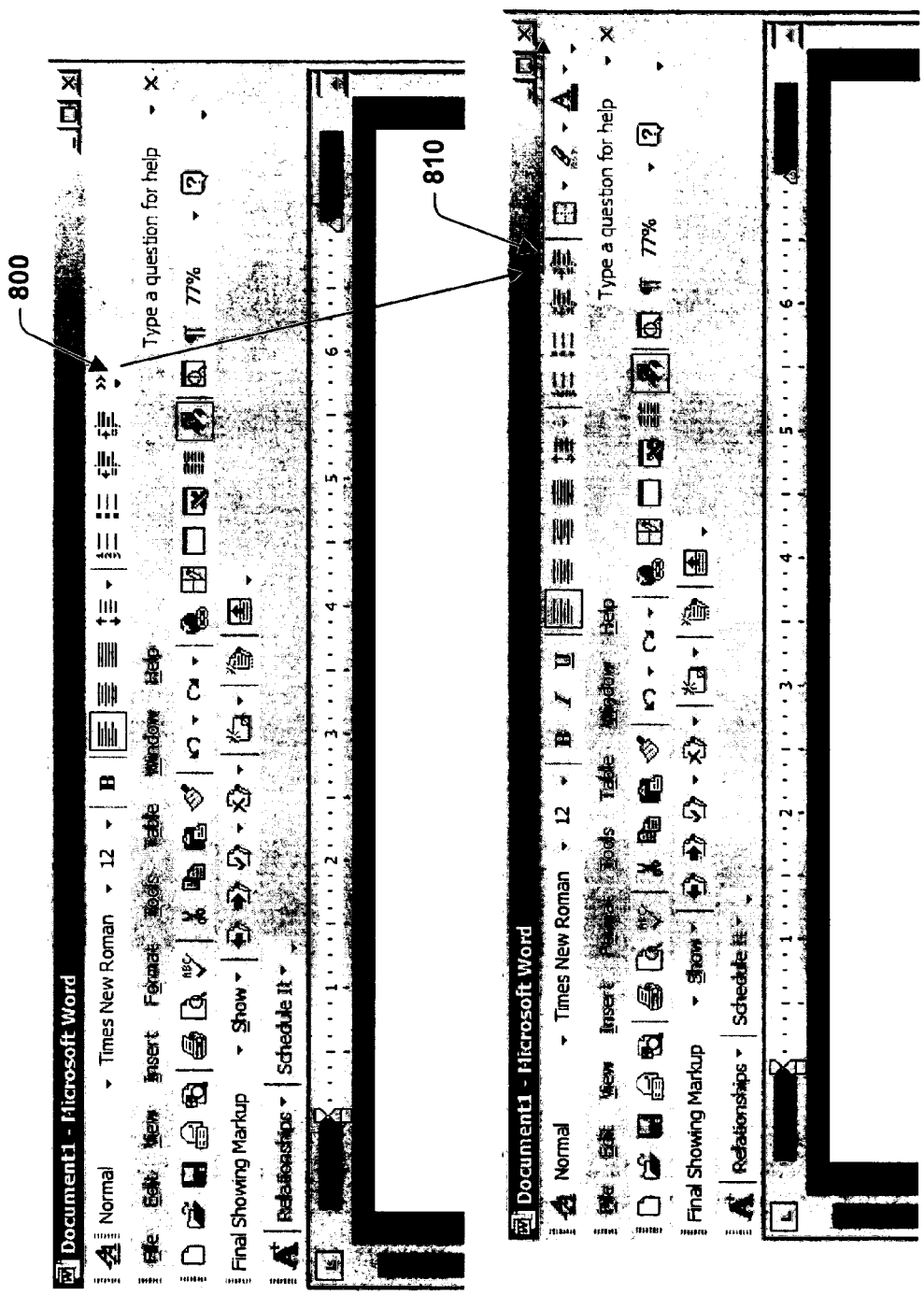
FIG. 8 is a diagram illustrating information hiding and clustering in a desktop environment in accordance with an aspect of the present invention.
Figure 9:
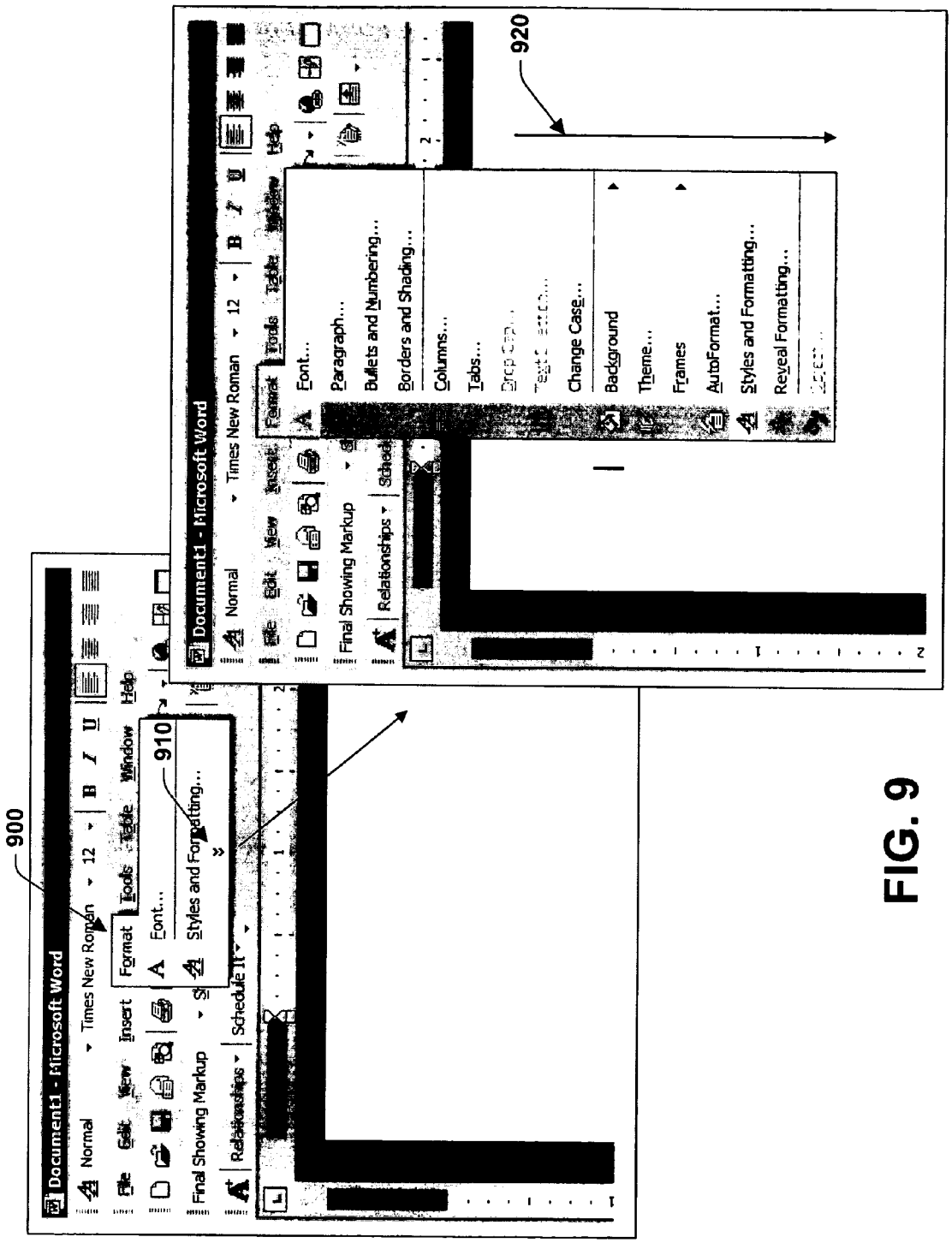
FIG. 9 is a diagram illustrating information hiding within an application environment in accordance with an aspect of the present invention.

FIG. 8 is a diagram illustrating information hiding within an application environment in accordance with an aspect of the present invention. FIG. 8 depicts a word processing application, wherein information is hidden behind a selection arrow 800. If a user desires to observe more information, the arrow 800 can be selected, wherein additional tools are provided as illustrated at 810. FIG. 9 illustrates a similar concept where a menu item is selected at 900 and an arrow 910 is selected to enable the user to select hidden information. The hidden information is displayed at 920 after the arrow 910 is selected.

Figure 10:
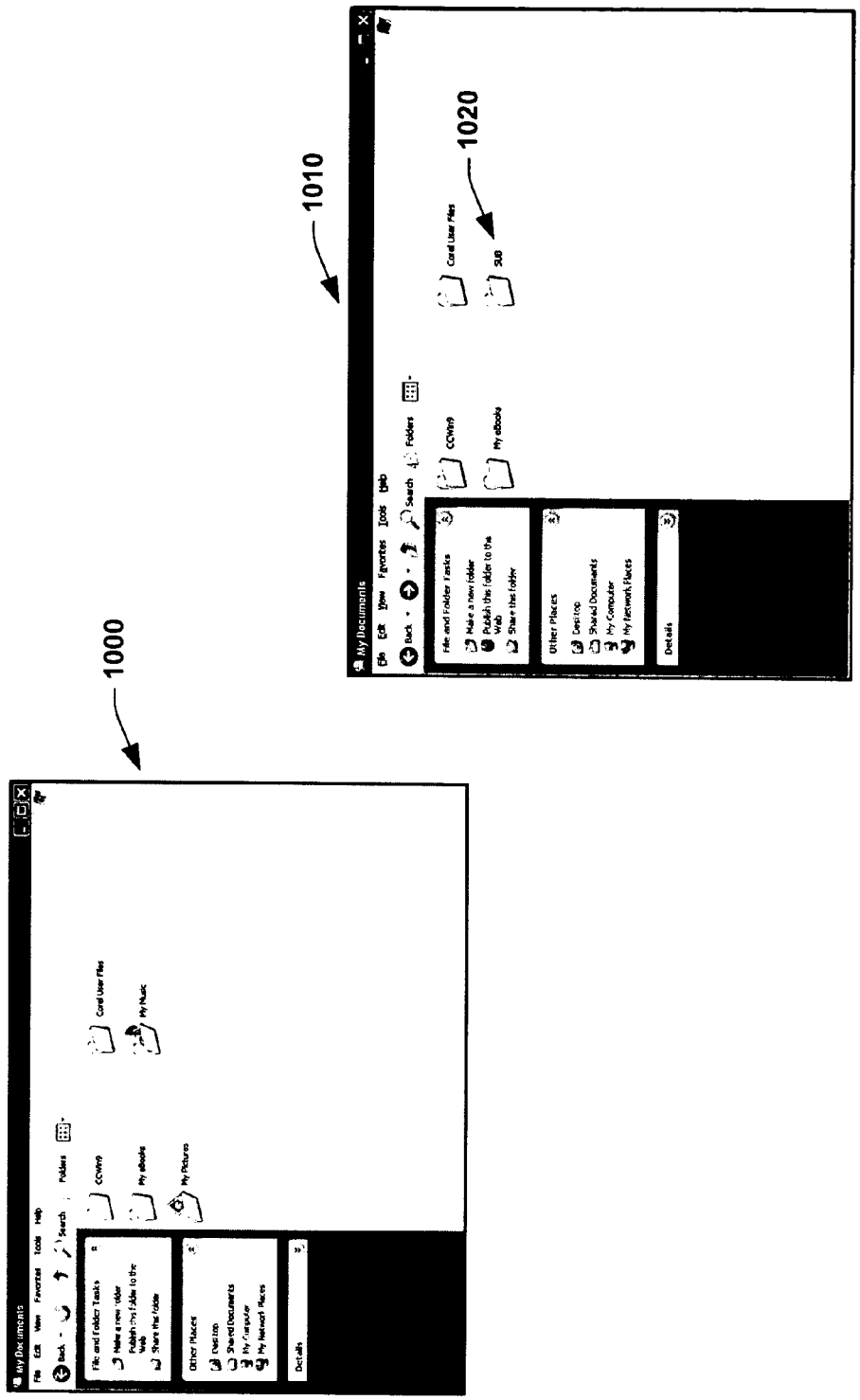
FIG. 10 is a diagram illustrating information relocation to a subfolder in accordance with an aspect of the present invention.

FIG. 10 is a diagram illustrating information relocation to a subfolder in accordance with an aspect of the present invention. In this example, a folder entitled "My Documents" is displayed at 1000 having five folders in the directory. After information hiding has been applied, four folders remain in the directory depicted at 1010. In this case, previous folders "My Music" and "My Pictures" have automatically been relocated and placed into a folder entitled "Sub" depicted at 1020.

Figure 11:
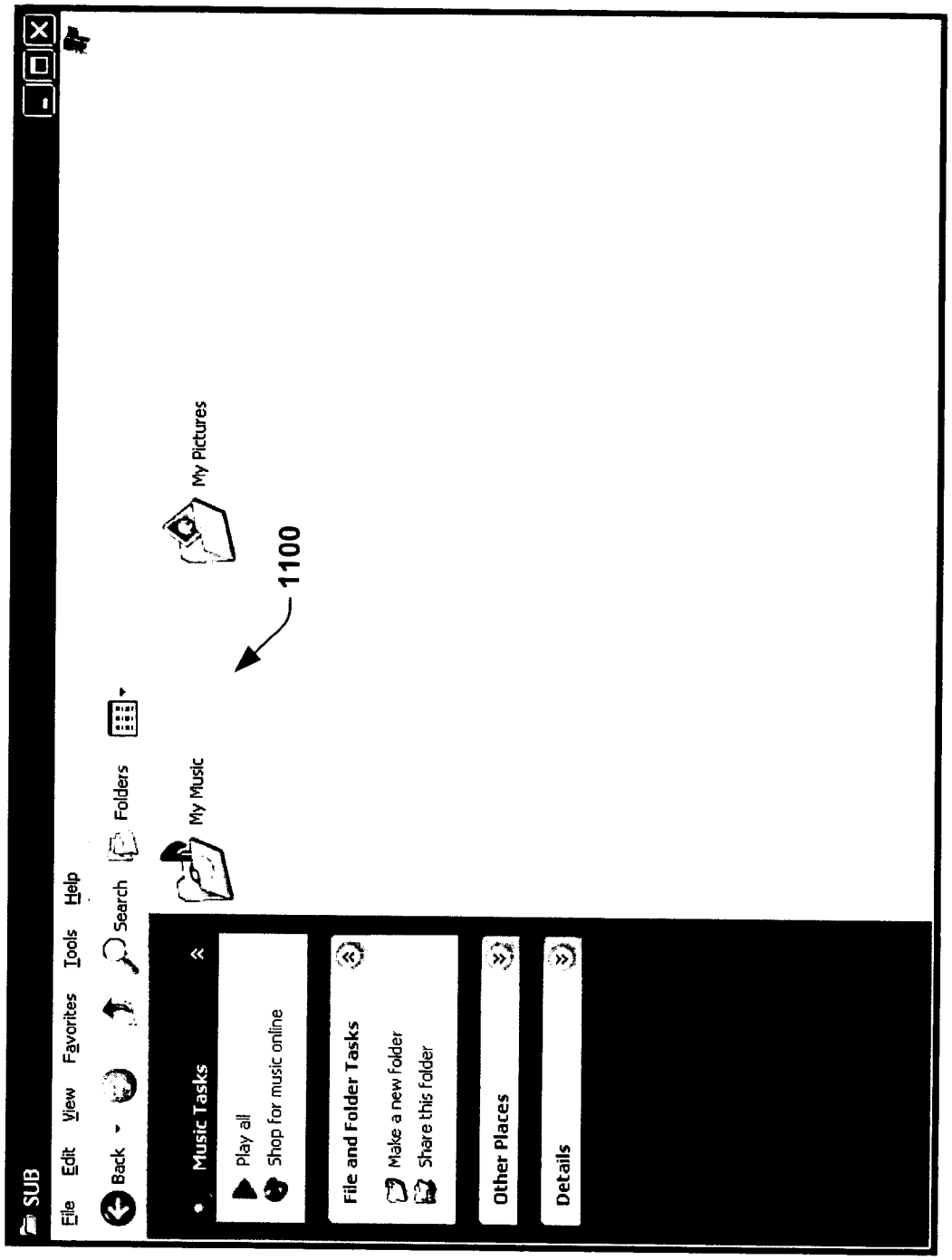
FIG. 11 is a diagram illustrating a subfolder where files have been relocated according to an aspect of the present invention.

FIG. 11 is a diagram illustrating a subfolder where files have been relocated according to an aspect of the present invention. As described above with respect to FIG. 10, folders "My Music" and "My Pictures" were automatically relocated and placed into a folder entitled "Sub." FIG. 11 depicts the contents of the subfolder after automated information hiding—"My Music" and "My Pictures" which are illustrated at 1100.

Figure 12:
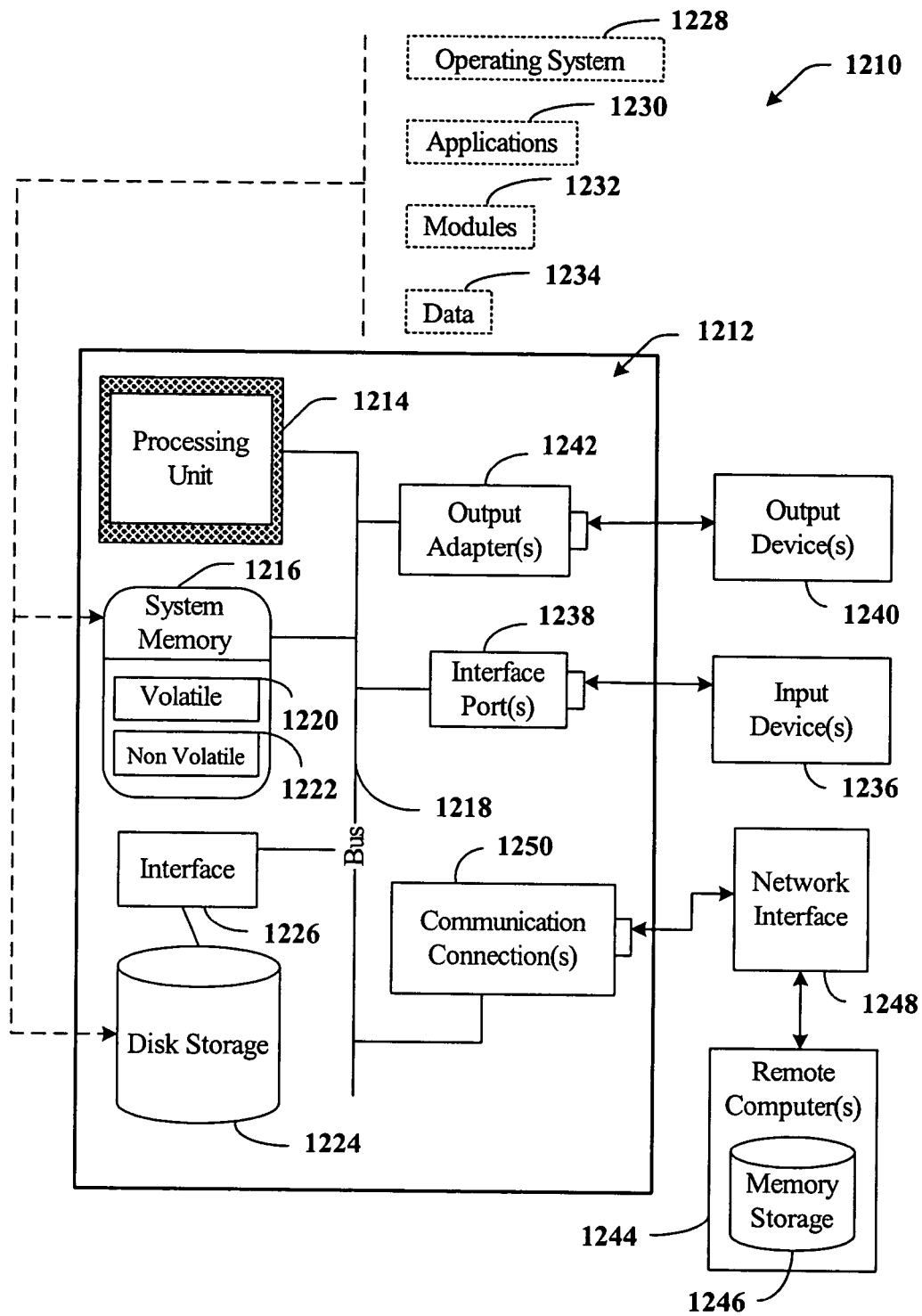
FIG. 12 is a schematic block diagram illustrating a suitable operating environment in accordance with an aspect of the present invention.

With reference to FIG. 12, an exemplary environment 1210 for implementing various aspects of the invention includes a computer 1212. The computer 1212 includes a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable ROM (EEPROM), or flash memory. Volatile memory 1220 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1212 also includes removable/non-removable, volatile/non-volatile computer storage media. FIG. 12 illustrates, for example a disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

It is to be appreciated that FIG. 12 describes software that acts as an intermediary between users and the basic computer resources described in suitable operating environment 1210. Such software includes an operating system 1228. Operating system 1228, which can be stored on disk storage 1224, acts to control and allocate resources of the computer system 1212. System applications 1230 take advantage of the management of resources by operating system 1228 through program modules 1232 and program data 1234 stored either in system memory 1216 or on disk storage 1224. It is to be appreciated that the present invention can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212, and to output information from computer 1212 to an output device 1240. Output adapter 1242 is provided to illustrate that there are some output devices 1240 like monitors, speakers, and printers, among other output devices 1240, that require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

Figure 13:
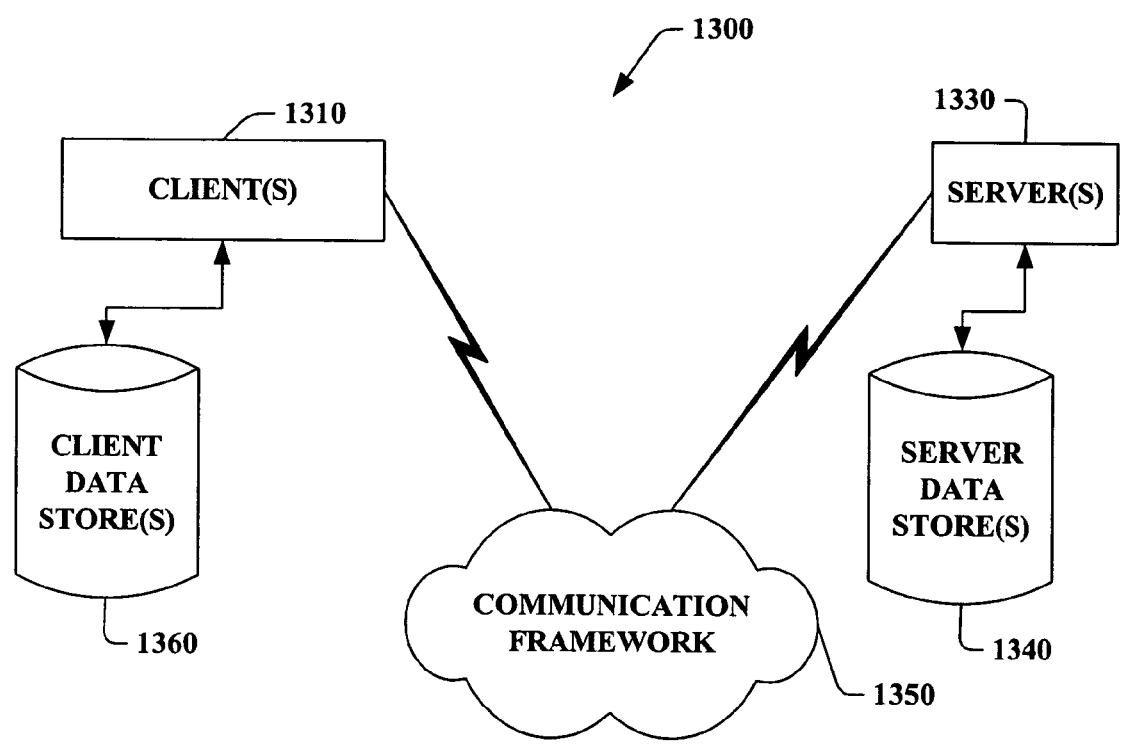
FIG. 13 is a schematic block diagram of a sample-computing environment with which the present invention can interact.

FIG. 13 is a schematic block diagram of a sample-computing environment 1300 with which the present invention can interact. The system 1300 includes one or more client(s) 1310. The client(s) 1310 can be hardware and/or software (e.g., threads, processes, computing devices). The system 1300 also includes one or more server(s) 1330. The server(s)

1330 can also be hardware and/or software (e.g., threads, processes, computing devices). The servers 1330 can house threads to perform transformations by employing the present invention, for example. One possible communication between a client 1310 and a server 1330 may be in the form of a data packet adapted to be transmitted between two or more computer processes. The system 1300 includes a communication framework 1350 that can be employed to facilitate communications between the client(s) 1310 and the server(s) 1330. The client(s) 1310 are operably connected to one or more client data store(s) 1360 that can be employed to store information local to the client(s) 1310. Similarly, the server(s) 1330 are operably connected to one or more server data store(s) 1340 that can be employed to store information local to the servers 1330.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates displaying information in connection with a computer user's computer workspace, comprising:
    at least one processor that executes a plurality of components, the components comprising:
        a component that determines a likelihood value for a plurality of display items, the likelihood for each of the plurality of display items indicating a likelihood that a user will access the display item as part of using the computer workspace, the likelihood being determined based at least in part on detected actions of the user indicating a context of user interaction with the computer workspace;
        a cost component that determines, for each of the plurality of display items, a navigation cost to access the display item if the display item is hidden on the display; and
        a hiding component that selectively exposes a subset of the plurality of display items, the subset being selected based at least in part upon the determined likelihood value and the navigation cost, the hiding component segmenting the plurality of display items a into a subset of displayed items d and one or more subsets of items h that are hidden but accessible via action or gesture,
        wherein the workspace comprises a word processing application and the display items are choices in a dropdown menu associated with a menu item relating to at least one function performed by the word processing application.

2. The system of claim 1, the action or gesture includes a mouse click or keystroke to navigate for hidden information.

3. The system of claim 1, the hiding component processes the set a that includes a number of elements |a|=n total candidate items that are potentially of interest or value to a user, the n items are automatically separated into proper subsets of a, including a displayed subset d of |d| items and a hidden subset h of |h| items, where |d|+|h|=n.

4. The system of claim 1, further comprising: a ranking component that includes a function that applies an ordering to the likelihood of items to a user in a context, defined by observed evidence, E.

5. The system of claim 4, the observed evidence E includes one or more of background information about usage, usage patterns of items or related items, content associated with items, time of day, content topic, recently accessed content or recently and accessed topic content.

6. The system of claim 4, the ranking component includes a ranking function as a coarse or accurate estimate of a likelihood that each item i in a set a is a target item at a time of display and/or access, denoted as p(i is target|E), wherein p is a probability.

7. The system of claim 6, the ranking component includes a probability function that maps to other ranking functions that are learned or applied as a heuristic function.

8. The system of claim 1, the hiding component determines an expected value including expected costs and benefits of moving the top items of d, leading to a cardinality of |d|, and the remaining |h| into the set of hidden items, h, where the total items in an original set a, |a|=|d|+|h|.

9. The system of claim 1, the hiding component determines at least one cost as follows:
    Cs,d: Cost of a user scanning through d given target is in d;
    Cs,h: Cost of a user scanning through h (when set of items h is accessed);
    Ch: Cost of a user accessing h;
    Cs,d' : Cost of a user scanning through d given that d does not contain the target; and
    Co: Cost of obfuscation of other content as a function of list, or other configuration of the items, size.

10. The system of claim 9, the costs can be summarized by processing functions that yield estimates of the costs for different situations based on details as specifics of a configuration.

11. The system of claim 10, further comprising functions developed through observation and fitting of time and/or metrics of user frustration as gleaned from user studies, or via heuristic estimates of the time, providing a set of functions that assign cost.

12. The system of claim 9, the cost, Cs,d is associated with scanning items in d, which is a function of configuration.

13. The system of claim 12, further comprising a list configuration having an expected cost (on average) of finding a target item on the list, when the target item is present, the expected cost is measured in terms of the number of items that are scanned before finding the target, is |d|/2 if the list is random, and if the list is sorted by likelihood (versus randomly), employ |d|/2 as a average-case expectation.

14. The system of claim 9, the at least one cost includes a cost of performing a gesture to make access to hidden items occur, Ch, which is a function of a user interface component.

15. The system of claim 14, the user interface component exposes h after a pre-set threshold of dwell time on d including a cost that is a function of the time associated with a dwell for a threshold time greater than the pre-set threshold.

16. The system of claim 15, wherein the cost comprises a value indicative of a time to perform an explicit gesture and/or a value computed to indicate user frustration with performing the explicit gesture.

17. The system of claim 14, the user interface component processes a model of cost to the user where the cost of scanning items grows linearly with the number of items, the user interface component sets a cost of access equivalent to scanning a predetermined number of items.

18. The system of claim 1, wherein the display item resides on a workspace including at least one of inside an application and outside the application.

19. The system of claim 1, wherein the display item includes at least one of icons, folders, directories, lists, menus, graphics, text, data, and applications.

* * * * *